(12) United States Patent
Crippa

(10) Patent No.: US 12,455,299 B2
(45) Date of Patent: Oct. 28, 2025

(54) CONTACT ELEMENT FOR A PROBE HEAD FOR TESTING HIGH-FREQUENCY ELECTRONIC DEVICES AND RELATING PROBE HEAD

(71) Applicant: TECHNOPROBE S.P.A., Cernusco Lombardone (IT)

(72) Inventor: Roberto Crippa, Cernusco Lombardone (IT)

(73) Assignee: TECHNOPROBE S.P.A., Cernusco Lombardone (IT)

( * ) Notice: Subject to any disclaimer, the term of this patent is extended or adjusted under 35 U.S.C. 154(b) by 268 days.

(21) Appl. No.: 18/252,141

(22) PCT Filed: Nov. 10, 2021

(86) PCT No.: PCT/EP2021/081283
§ 371 (c)(1),
(2) Date: May 8, 2023

(87) PCT Pub. No.: WO2022/101288
PCT Pub. Date: May 19, 2022

(65) Prior Publication Data
US 2024/0012025 A1 Jan. 11, 2024

(30) Foreign Application Priority Data
Nov. 13, 2020 (IT) .................. 102020000027182

(51) Int. Cl.
*G01R 1/067* (2006.01)
*G01R 1/073* (2006.01)

(52) U.S. Cl.
CPC ..... *G01R 1/06772* (2013.01); *G01R 1/06722* (2013.01); *G01R 1/06727* (2013.01); *G01R 1/07314* (2013.01)

(58) Field of Classification Search
CPC ............ G01R 1/06772; G01R 1/06722; G01R 1/07314; G01R 1/06761; G01R 1/07371; G01R 1/06733; G01R 1/06727
See application file for complete search history.

(56) References Cited

U.S. PATENT DOCUMENTS 6,464,511 B1 * 10/2002 Watanabe .......... G01R 1/07371
439/700
7,550,855 B2 * 6/2009 Hantschel ............... B81B 3/001
257/691
(Continued)

FOREIGN PATENT DOCUMENTS

KR 20100037431 A 4/2010
WO WO-03100446 A2 * 12/2003 ......... G01R 1/07314
(Continued)

OTHER PUBLICATIONS

International Search Report and Written Opinion for Corresponding International Application No. PCT/EP2021/081283 (9 Pages) (Jan. 25, 2022).

*Primary Examiner* — Paresh Patel
(74) *Attorney, Agent, or Firm* — Lucas & Mercanti, LLP

(57) ABSTRACT

A contact element for a probe head for an electronic device test apparatus is disclosed, having a body extending along a longitudinal axis between a first and a second opposite contact end, each made of electrically conductive material. The body includes a first section which extends over a distance less than 1000 μm along the longitudinal axis starting from the first contact end towards the second contact end, a second section which extends along the longitudinal axis starting from the second contact end towards the first contact end, and a third section, interposed between the first and second sections, made of an electrically insulating material. The sections follow each other along the longitudinal axis so that the first contact end is included only in the (Continued)

first section, the second contact end is included only in the second section, and the third section electrically insulates the first section from the second section.

20 Claims, 10 Drawing Sheets

(56) References Cited

U.S. PATENT DOCUMENTS

| | | | |
|---|---|---|---|
| 11,262,383 B1* | 3/2022 | Smalley | G01R 3/00 |
| 2008/0139017 A1* | 6/2008 | Kiyofuji | G01R 1/07371 |
| | | | 439/75 |
| 2014/0352460 A1* | 12/2014 | Kuo | G01R 1/07357 |
| | | | 73/866.5 |
| 2017/0122980 A1* | 5/2017 | Crippa | G01R 1/07307 |
| 2018/0080955 A1 | 3/2018 | Hsieh | |
| 2018/0267083 A1* | 9/2018 | Wei | G01R 1/06727 |
| 2019/0101568 A1* | 4/2019 | Hsieh | G01R 1/06711 |
| 2019/0137544 A1* | 5/2019 | Hsieh | G01R 15/16 |
| 2019/0302148 A1* | 10/2019 | Maggioni | G01R 1/06772 |
| 2019/0302185 A1* | 10/2019 | Maggioni | G01R 1/07392 |
| 2020/0271692 A1 | 8/2020 | Crippa et al. | |
| 2021/0389348 A1* | 12/2021 | Lesher | G01R 1/06772 |

FOREIGN PATENT DOCUMENTS

| | | | | |
|---|---|---|---|---|
| WO | WO-2018153949 A1 * | 8/2018 | | G01R 1/06755 |
| WO | WO-2019091946 A1 * | 5/2019 | | G01R 1/06738 |
| WO | WO-2019219638 A1 * | 11/2019 | | G01R 1/06716 |

* cited by examiner

CONTACT ELEMENT FOR A PROBE HEAD FOR TESTING HIGH-FREQUENCY ELECTRONIC DEVICES AND RELATING PROBE HEAD

CROSS-REFERENCE TO RELATED APPLICATIONS

This application is a 371 of PCT/EP2021/081283, filed Nov. 10, 2021, which claims the benefit of Italian Patent Application No. 102020000027182, filed Nov. 13, 2020.

FIELD OF APPLICATION

The present invention relates to a contact element for a probe head for a test apparatus of electronic devices integrated on a semiconductor wafer, for example high-frequency devices, and the following description is made with reference to this application field with the only purpose of simplifying the exposition thereof.

Background of the Invention

As it is well known, a probe head is essentially a device adapted to electrically connect a plurality of contact pads of a microstructure, in particular an electronic device integrated on wafer, with corresponding channels of a probe machine which carries out the functionality test thereof.

The test carried out on integrated devices is useful to detect and isolate defective devices already while being produced. Normally, the probe heads are then used for the electrical test of the devices integrated on a wafer before cutting and mounting the same inside a chip containment package.

A probe head normally comprises a large number of contact elements, for example contact probes made of special alloys with good electrical and mechanical properties and each provided with at least one contact portion for a corresponding plurality of contact pads of a device under test.

A vertical probe head essentially comprises a plurality of contact probes held by at least one pair of plates or guides which are substantially plate-shaped and parallel to each other. Said guides are provided with suitable guide holes and are placed at a certain distance from each other in order to leave a free area or a gap for the movement and the possible deformation of the contact probes. The pair of guides comprises an upper guide and a lower guide, both provided with respective guide holes within which the contact probes axially slide.

The good connection between the contact probes and the contact pads of the device under test is guaranteed by the pressure of the probe head on the device, wherein the contact probes, which are movable within the guide holes made in the upper and lower guides, are subjected, during said pressing contact, to a bending inside the gap between the guides and a sliding inside said guide holes.

Furthermore, the bending of the contact probes in the gap can be assisted by a suitable configuration of the contact elements themselves or of the guides thereof, as schematically illustrated in FIG. 1, wherein, for simplicity of illustration, it has been represented only one contact probe of the plurality of contact probes which are normally comprised in a probe head, the illustrated probe head being of the so-called shifted-plate type.

In particular, in FIG. 1, it is schematically illustrated a probe head 1 comprising at least one upper plate or guide 2 and a lower plate or guide 3, having respective upper guide holes 2a and lower guide holes 3a within which a contact probe 4 slides.

The contact probe 4 has at least one end or contact tip 4a, wherein the terms "end" or "tip" indicate herein an end portion, which is not necessarily pointed or sharp. In particular, the contact tip 4a abuts onto a contact pad 5a of a device under test 5, carrying out the mechanical and electrical contact between said device and a testing equipment (not represented).

In some cases, the contact probes are fixedly secured to the probe head at the upper guide: in this case, the probe head is referenced as probe head with blocked probes. Alternatively, there are probe heads having probes which are not fixedly secured but kept interfaced to a board by a microcontactor: in this case, the probe head is referenced as probe head with non-blocked probes. The microcontactor is usually called "space transformer" since, in addition to contacting the probes, it also allows to spatially route the contact pads made thereon, with respect to the contact pads on the device under test, in particular with a loosening of the distance constraints between the centres (pitch) of the same pads.

In this case, as illustrated in FIG. 1, the contact probe 4 has a further contact tip 4b, indicated as contact head, towards a plurality of contact pads 6a of a space transformer 6. The good electrical contact between probes and space transformer is guaranteed (analogously to the contact with the device under test=by the pressure of the contact heads 4b of the contact probes 4 on the contact pads 6a of the space transformer 6.

The upper guide 2 and the lower guide 3 are suitably spaced by an air gap 7 which guarantees the deformation of the contact probes 4 and allows the contact of contact tip and head of the contact probes 4 with the contact pads of the device under test 5 and of the space transformer 6, respectively.

It is known that the correct operation of a probe head is basically linked to two parameters: the vertical displacement, or overtravel, of the contact probes and the horizontal displacement, or scrub, of the contact tip of said probes. These characteristics are to be evaluated and calibrated while making a probe head, and the good electrical connection between probes and device under test is to be always guaranteed.

It is equally important to guarantee that the pressing contact of the contact tip of the probes on the contact pads of the device under test is not so high so as to cause the breakage of the probe or the pad itself.

This is particularly important in the case of the so-called short probes, that is probes with a body limited in length, in particular with dimensions lower than 5000 µm. These probes are used for example in high-frequency applications, the reduced length of the probes limiting the self-inductance phenomenon. In particular, the term "probes for high-frequency applications" indicates probes which are able to carry signals with frequencies higher than 1 GHz.

In fact, there is the need to make probe heads which are able to carry signals with higher and higher frequencies, up to the radiofrequencies, with a resulting reduction of the length of the contact probes to allow carrying said signals without adding noise, for example due to the above-mentioned self-inductance phenomenon.

In such case, however, the reduced length of the body of the probes dramatically increases the stiffness of the probe, which causes an increase of the force exerted by the respective contact tip on the contact pads of a device under test, which can lead to a breakage of said pads, with irreparable damage of the device under test, which is to be avoided. Even more dangerously, the increase of the stiffness of the contact probe due to the reduction of the length of the body thereof also increases the breakage risk of the probe itself.

Contact elements in the form of pogo pins are also known in the field, which pins essentially comprise an elastic body connected to two end portions, said elastic body compressing when the end portions contact the contact pads of the device under test and the space transformer. The above-mentioned problems can be found also in this case, that is why it is desirable to devise a general solution which allows an improved test at high frequency.

It is therefore an aim of the present disclosure to devise contact elements for a probe head having functional and structural features which allow the usage thereof in high-frequency applications, while lowering the risk of breakage of said contact elements and of the contact pads of a device under test with which they are in contact, without adding noise to the signals, thus overcoming in a simple way the limitations and drawbacks which still affect the known solutions.

SUMMARY OF THE INVENTION

The disclosure provides a contact element wherein a section thereof, which section comprises a contact tip for contacting a device under test, is electrically conductive and has a length lower than 1000 µm, preferably lower than 500 µm. This conductive section is adapted to contact conductive tracks or portions of a guide of a probe head in which the contact element is housed, and this conductive section is separate from the rest of the conductive body by an intermediate insulating section, the rest of the conductive body having a damping function and being adapted to abut, by means of a contact head thereof, onto a support plate associated with the probe head. The contact element may advantageously be both a pogo pin (wherein the upper portion ensures the damping effect thanks to the presence of the spring) and a vertical contact probe (wherein this solution allows to maintain enough elasticity).

An exemplary contact element for a probe head for a test apparatus of electronic devices according to the present disclosure comprises a body extended along a longitudinal axis between a first contact end, which is adapted to contact pads of a device under test, and a second and opposite contact end, wherein said body comprises a first section which extends along the longitudinal axis starting from the first contact end towards the second contact end and is made of an electrically conductive material, said first section extending over a distance lower than 1000 µm, a second section which extends along the longitudinal axis starting from the second contact end towards the first contact end and is made of an electrically conductive material, and a third section which is interposed between the first section and the second section and is made of an electrically conductive material, wherein said sections follow each other along the longitudinal axis such that the first contact end is included only in the first section and the second contact end is included only in the second section, and wherein the third section is configured to electrically insulate the first section from the second section.

More particularly, the invention comprises the following additional and optional features, taken singularly or in combination if needed.

According to an aspect of the present invention, the second section can have a length ranging from 0.5 mm to 8 mm and the third section can have a length ranging from 1 µm to 2 mm.

According to an aspect of the present invention, the electrically insulating material of the third section can be one of $Al_2O_3$, parylene, or silicon.

According to an aspect of the present invention, the first section can be configured to contact conductive elements of a guide of a probe head.

According to an aspect of the present invention, the contact element can comprise at least one wall configured to contact a corresponding metalized wall of a guide hole of the guide of the probe head at the first section, said first section being configured to carry signals from the device under test to the metalized wall of the hole. In an embodiment, the second section is configured to provide only a mechanical support.

According to an aspect of the present invention, the first section can comprise protruding elements which project from the body, said protruding elements defining conductive abutment surfaces.

According to an aspect of the present invention, the contact element can be in the form of a vertical contact probe of the buckling beam type.

Alternatively, the contact element can be in the form of a pogo pin, the second section comprising an elastic element adapted to be compressed during the test, and the third section being arranged between said elastic element and the first section.

The present invention also refers to a probe head for an electronic device test apparatus, comprising at least one guide provided with a plurality of guide holes for housing a respective plurality of contact elements, said probe head being characterized in that the contact elements are made as above disclosed, said at least one guide comprising conductive elements which are configured to be electrically contacted by the first section of said contact elements.

According to an aspect of the present invention, the at least one guide can be a lower guide arranged at the first section of the contact elements.

According to an aspect of the present invention, the conductive elements of the guide can comprise conductive tracks which extend from the guide holes, said conductive tracks being formed on a face of the guide and/or being embedded in said guide.

According to an aspect of the present invention, the conductive elements of the guide can comprise at least one conductive portion which includes at least one group of the guide holes, and it is configured to contact and short-circuit, at the first section, a corresponding group of contact elements which are housed in said group of holes and are adapted to carry a determined type of signal.

According to an aspect of the present invention, the conductive portion can be formed on a face of the guide or can be embedded in said guide.

According to an aspect of the present invention, the conductive portion can be in the form of a plurality of conductive layers, each of said conductive layers including and electrically connecting to each other the holes of a respective group of the guide holes, and being configured to contact the first section of a corresponding group of the contact elements, wherein contact elements of each respective group are adapted to carry a same type of signal.

According to an aspect of the present invention, at least one portion of the inner surface of the guide holes, preferably the entire wall, can be covered by a conductive portion connected with the conductive elements of the guide, the first section of the contact elements being adapted to electrically contact the conductive portion of the guide holes.

According to an aspect of the present invention, the probe head can comprise further contact elements which are entirely conductive and adapted to carry a signal from a device under test directly to a support plate associated with the probe head, said further contact elements being adapted to carry power signals and/or ground signals and/or low-frequency signals between the device under test and the support plate.

According to an aspect of the present invention, the contact elements can comprise, at the first section, protruding elements which project from the body, said protruding elements defining conductive abutment surfaces configured to abut onto the conductive elements of the guide, such as for example onto the conductive portions of the guide or onto conductive tracks, or also other conductive elements, such as for example a flexible membrane.

According an aspect of the present invention, the probe head can further comprise a flexible membrane which is arranged on a surface of the guide and is a conductive element of said guide, i.e. it acts as a conductive element of the guide, said flexible membrane being shaped such that a portion thereof is arranged on one or more of the conductive abutment surfaces of the first section and is adapted to be raised during the contact with the device under test, said flexible membrane comprising conductive tracks which extend to route the signals carried by the first section.

According to an aspect of the present invention, the conductive elements can be in the form of vertical contact probes of the buckling beam type, the probe head comprising a lower guide and an upper guide whose guide holes are shifted from each other, deforming the body of said contact probes.

Alternatively, the conductive elements can be in the form of pogo pins, the second section comprising an elastic element adapted to be compressed during the test, and the third section being arranged between said elastic element and the first section.

The characteristics and advantages of the contact element and of the probe head according to the invention will be apparent from the description, made hereinafter, of an embodiment thereof, given by way of indicative and non-limiting example, with reference to the enclosed drawings.

DETAILED DESCRIPTION

Figure 1:
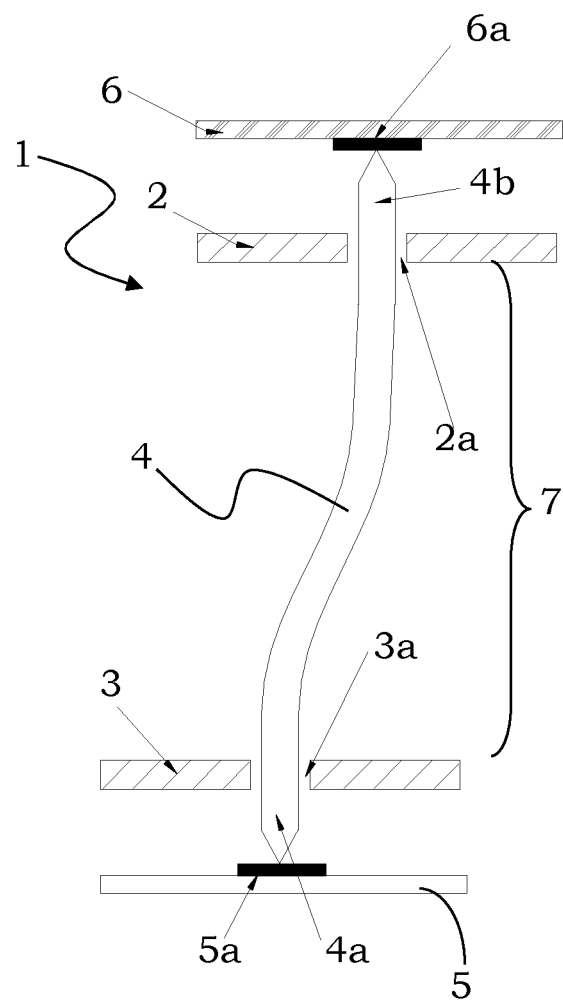
FIG. 1 schematically shows a contact element according to the prior art.
Figure 2:
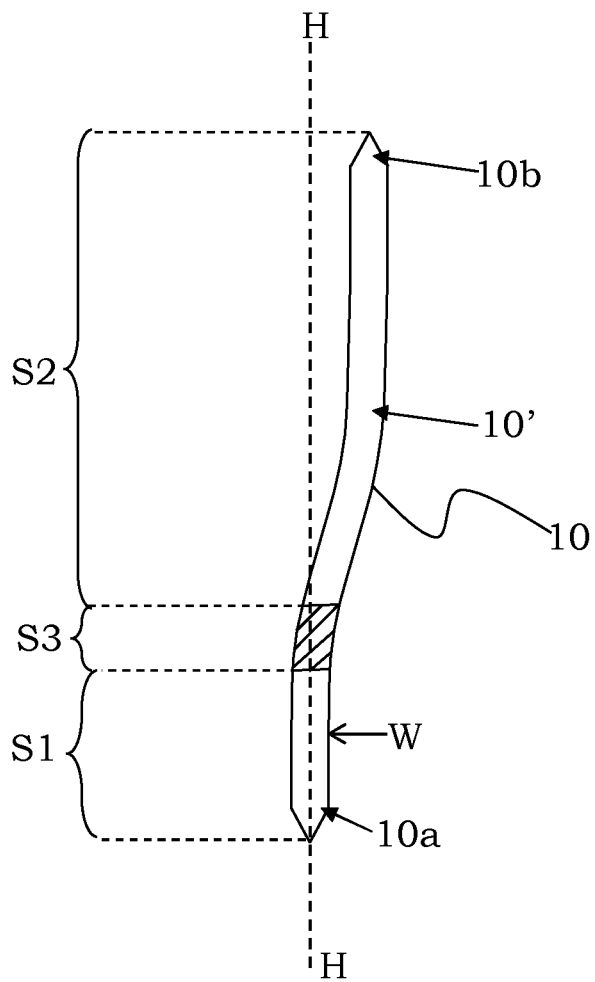
FIG. 2 schematically shows a contact element according to the present invention.

With reference to those figures, a contact element for a probe head for a test apparatus of electronic devices integrated on a semiconductor wafer is globally and schematically indicated with 10.

It is worth noting that the figures represent schematic views and are not drawn to scale, but instead they are drawn so as to emphasize the important features of the invention. Moreover, in the figures, the different elements are depicted in a schematic manner, and their shape may vary depending on the application desired. It is also noted that in the figures the same reference numbers refer to elements that are identical in shape or function. Finally, particular features described in relation to an embodiment illustrated in a figure are also applicable to the other embodiments illustrated in the other figures.

As it will be illustrated in the following more in detail, the contact element 10 is adapted to be housed in a probe head for testing high-frequency electronic devices.

The contact element 10 comprises a body which extends along a longitudinal axis H-H between a first contact end or contact tip 10*a* and a second contact end or contact head 10*b*, wherein the terms "contact tip" and "contact head" indicate herein contact portions which are not necessarily pointed or sharped and which may have any suitable form or shape. The first contact end 10*a* is adapted to contact pads of a device under test, while the second contact end 10*b* is adapted to abut onto a support plate or in general onto an element of the probe head or of a probe board.

Advantageously according to the present invention, the contact element is divided in three sections which follow each other along the longitudinal axis H-H, said sections having different characteristics in terms of electrical conductivity.

In particular, in an embodiment of the present invention, the contact element 10 comprises a first section S1, which extends along the longitudinal axis H-H starting from the first contact end 10*a* towards the second contact end 10*b* and is made of an electrically conductive material, and a second section S2, which extends along said longitudinal axis H-H starting from the second contact end 10*b* towards the first contact end 10*a*, said second section S2 being also electrically conductive. As illustrated in the figures, the first section S1 does not reach the second contact end 10*b*, as well as the second section S2 does not reach the first contact end 10*a*, since a third section S3 (which is made of an insulating material) is interposed between them, as will be detailed in the following.

In other words, the first contact end 10*a* of the contact element 10 is included only in the first section S1, which does not include the second contact end 10*b*, while said second contact end 10*b* is included only in the second section S2, which does not include the first contact end 10*a*.

The sections S1 and S2, which are both conductive, are preferably made of a same conductive material, even if respective different materials can obviously be used, wherein each suitable conductive material can be used to guarantee the desired dampening effect.

The present invention will be initially illustrated in the following according to a non-limiting example in which the contact element is a vertical contact probe provided with a body which is subjected to bending during the contact with the device under test, even if all the teachings of the present disclosure apply also to other contact elements, such as for example pogo pins. To this end, also an embodiment in which the contact elements are pogo pins will be described, and all the following observations apply also to this embodiment.

The contact probe 10 has an overall length, which is herein referred to as a dimension measured along the longitudinal axis H-H, comprised between 3 mm and 10 mm.

Suitably, the first section S1 extends starting from the first contact end for a distance lower than 1000 µm, preferably lower than 500 µm, so as to make the contact probe 10, and the probe head which houses it, particularly suitable for testing high-frequency devices. In fact, the first contact end 10a of the contact probe 10 carries out an electrical and mechanical contact with the contact pads of the device under test, while the second contact end 10b is adapted to carry out only a mechanical contact with a support plate, the second section S2 having a dampening function. In this way, the signals coming from the device under test are carried only by the first section S1, which has a length less than 1000 µm and thus much lower than the whole length of the contact probe 10. In this way, the contact probe 10 is adapted to carry high-frequency signals, like a short probe. In particular, as will be detailed in the following, the first section S1 is configured to contact conductive elements, such as for example conductive tracks or plates, of a guide of a probe head.

In an embodiment of the present invention, the second section S2 has a length substantially ranging from 0.5 mm to 8 mm, that is enough to guarantee the above-mentioned dampening effect.

As mentioned above, the probe body 10' further comprises a third section S3 interposed between the first section S1 and the second section S2, said third section S3 being suitably made of an electrically insulating material so as to insulate the first section S1 from the second section S2. Said third section S3 does not comprise the first contact end and does not comprise the second contact end 10b.

By way of example, the intermediate insulating third section S3 is made of one of $Al_2O_3$, parylene, or insulating silicon. Obviously, the present invention is not limited by the particular insulating material, and any suitable insulating material, also semiconductor, can be used.

Furthermore, in an embodiment of the present invention, the third section S3 has a length substantially ranging from 1 µm to 2 mm.

In this way, the sections S1, S2 and S3 follow each other along the longitudinal axis H-H of the contact probe such that the first contact end 10a is included only in the first section S1 and the second contact end 10b is included only in the second section S2. Suitably, in this embodiment, the third section S3 is configured to electrically insulate the first section S1 from the second section S2. Based on this configuration, the signals are then carried only in the short first section S1, while the second section S2, which is insulated from the first section S1 by the third section S3, performs only a mechanical contact; more in particular, said second section S2 has a length and is made of a material such as to guarantee the desired bending (or flexion) of the contact probe during the test, preventing the risk of breakage, that is it is able to guarantee the same damping effect of a traditional probe. In this way, the contact probe 10, as a whole, has electrical performances which are much higher than those of the traditional contact probes and at the same time has mechanical performances which are not lower.

In other words, the second section S2, which has a length much higher than the one of the first section S1, guarantees a good bending capacity of the contact probe 10 during its contact with the contact pads of the device under test, avoiding the breakage thereof and/or of the contact pads of the device. Suitably, materials adapted to maximize such damping effect during the contact with the device under test are used for the second section S2.

In an alternative and less preferred embodiment of the present invention, the second section S2 can also be made of an insulating material different from the one of the third section S3, said second section S2 having in any case a damping function. In this case, the third section S3 is substantially a physical connection between the two sections S1 and S2, which are separate by said third section S3, that is it is an interface element between said sections. In this embodiment, the contact probe would be divided in three different sections, of which only the first section is conductive.

Figure 3:
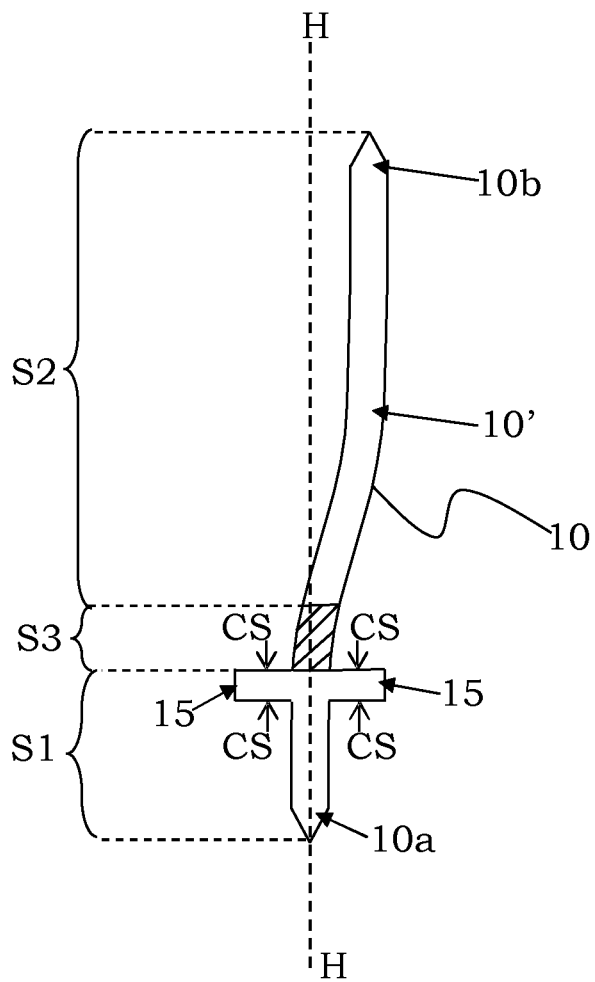
FIG. 3 schematically shows a contact element according to an embodiment of the present invention.

In an embodiment of the present invention, illustrated in FIG. 3, the first section S1 comprises protruding elements 15 which project from the probe body 10', said protruding elements 15 defining conductive abutment surfaces CS. More in particular, the protruding elements 15 project (or protrude) from the probe body 10' according to opposite directions, preferably orthogonal to the longitudinal axis H-H. Each protruding element 15 comprises faces that are opposed to each other with respect to the projection axis, said faces defining the above-mentioned conductive abutment surfaces CS. In a particular embodiment, the protruding elements 15 are made such that the first section S1 is substantially T-shaped, wherein said protruding elements define the crossbar of the T.

According to an embodiment of the present invention, the first section S1 and the second section S2 are connected to the third non-conductive section S3 for example via a glue, an adhesive layer or a metal layer which can be locally welded (for example welded by laser welding), or in any other suitable way.

Figure 4:
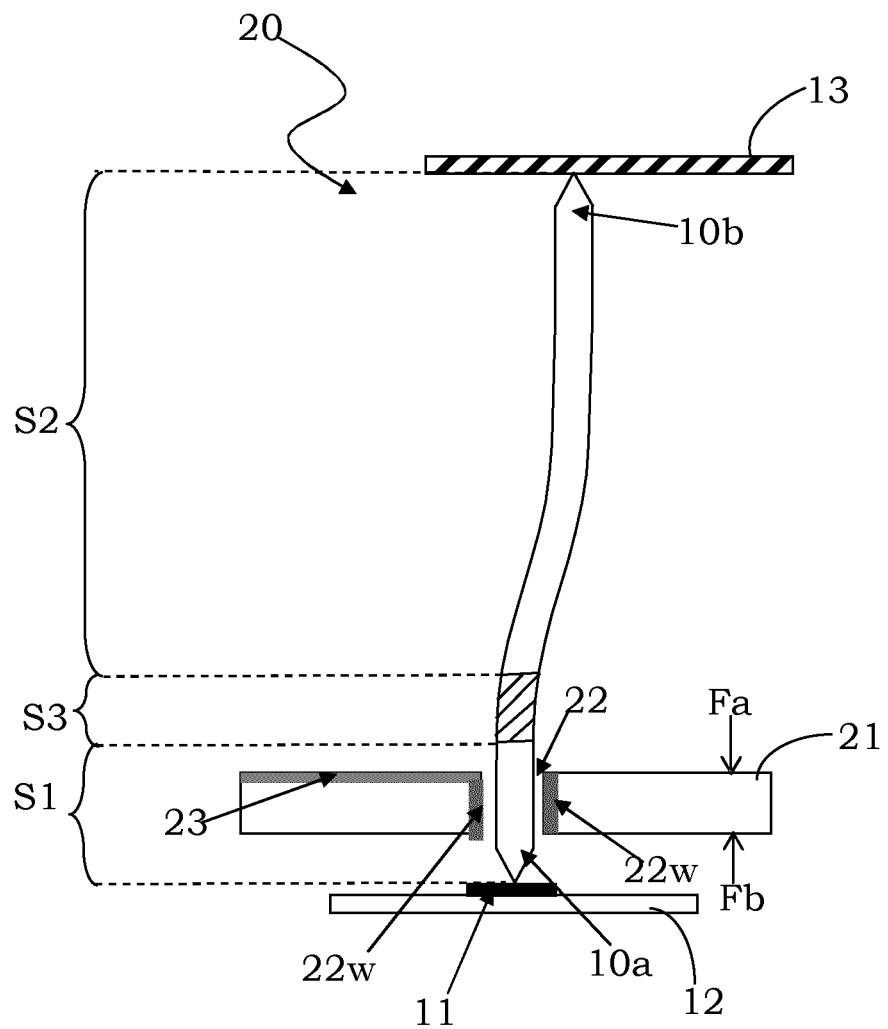
FIG. 4 schematically shows a probe head comprising a contact element according to the present invention.

As previously mentioned, a plurality of contact probes 10 of the above-mentioned type is housed in a probe head for testing electronic devices integrated on a semiconductor wafer, said probe head being indicated herein with the reference number 20, as schematically illustrated in FIG. 4.

For the sake of simplicity, the probe head 20 is represented in the figures as comprising a limited number of contact probes 10, even if it can comprise any number of contact probes according to needs and/or circumstances, the figures being provided only by way of an indicative and non-limiting example of the present invention. Moreover, as previously mentioned, the probe head 20 is initially illustrated as comprising a plurality of vertical contact probes, even if it can comprise various types of conductive elements, such as for example pogo pins, to which the same observations apply.

The first contact end 10a of each contact probe 10 is adapted to abut onto contact pads 11 of a device under test integrated on a semiconductor wafer 12, while the second contact end 10b is adapted to abut onto a support plate 13 associated with the probe head 20, wherein the support plate can be for example a printed circuit board (PCB), or any other suitable support.

The probe head 20 comprises at least one guide 21 provided with a plurality of guide holes 22 adapted to house a corresponding plurality of contact probes 10.

Advantageously according to the present invention, the guide 21 is a lower guide arranged at the first conductive section S1 of each contact probe 10, such that the inner walls of the guide holes 22 of said guide 21 can contact said first section S1, in particular through electrical connection means or conductive elements comprised in the guide 21. Obviously, an upper guide can be included in the probe head, and the guide holes of said upper guide can be shifted with respect to the corresponding lower guide holes; a pair of lower guides and/or a pair of upper guides can also be provided.

Still referring to FIG. 4, the conductive elements of the guide 21 comprise suitable conductive tracks 23 which extend from the guide holes 22 and are adapted to extract and carry the signal carried by the contact probes 10, in particular by the first section S1, said conductive tracks 23 being adapted to be electrically contacted (directly or indirectly contacted) by said first section S1.

Accordingly, the guide 21 is adapted to route the signals (for example towards the PCB associated with the probe head 20) by means of the conductive tracks 23 which extend therein, and thus said guide 21 also performs the function generally performed by the space transformers associated to the known probe heads.

In the embodiment of the FIG. 4, the contact between the first section S1 of the contact probe 10 and the conductive track 23 is a sliding contact, wherein said sliding contact can be guaranteed by the thickness of the conductive track 23 itself or, preferably, by a metalized wall of the guide hole, as will be detailed in the following.

As illustrated in FIG. 4, the conductive track 23 is a surface conductive track, that is formed on a face of the guide 21 (the face Fa in the example of the figure), said conductive track 23 emerging at the guide hole 22 (or at the metallization of said guide hole).

Even if FIG. 4 shows a surface conductive track 23 made on the face Fa of the guide 21 (that is on an upper face thereof according to the local reference system of the figures), said conductive track 23 can also be formed on the face Fb, opposite the face Fa (that is on a lower face thereof according to the local reference system of the figures), of the guide 21, as well as on any other face thereof.

In embodiments not illustrated in the figures, the conductive track 23 can also be embedded in the guide 21 and it can emerge at the guide hole 22.

Figure 5:
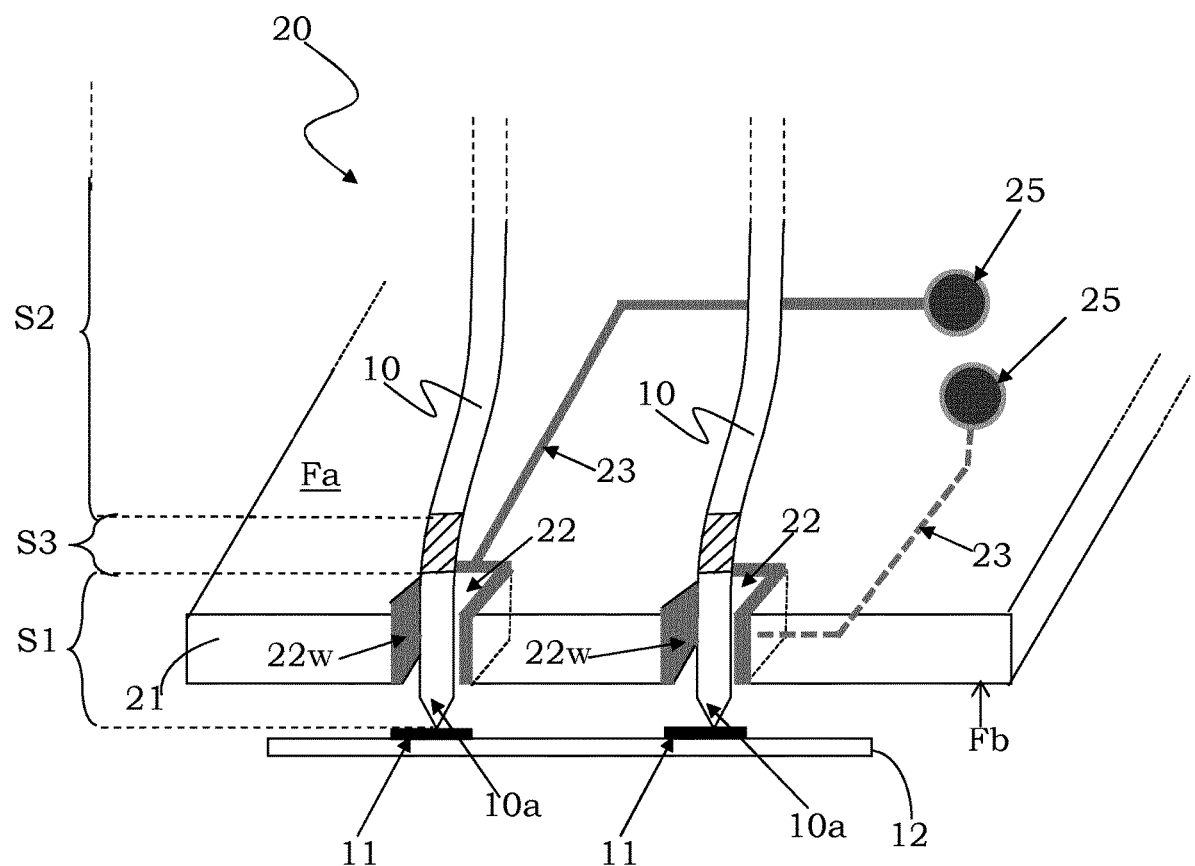
FIG. 5 schematically shows a sectional prospective view of a probe head according to the present invention, wherein a guide thereof comprises superficial and embedded conductive tracks.

As mentioned above, according to a preferred embodiment of the present invention illustrated in more detail in FIG. 5, at least one portion of the inner surface of the guide holes 22 is covered by a conductive portion 22w. Even more preferably, the inner surface of the guide holes 22 is completely covered by the conductive portion 22w. In this way, the first conductive section S1 is able to contact the conductive portion 22w of the guide holes 22, through a sliding contact, so that the signal carried by the contact probe 10, in particular by said first section S1, can be extracted at the guide holes 22 by the conductive tracks 23, which are connected to the conductive portions 22w, i.e. to the metalized walls of the holes, in particular they extend starting from them.

In other words, the contact probes 10 comprise at least one wall W (in particular at the first section S1) configured to contact a corresponding metalized wall 22w of a guide hole 22 of the guide 21 at the first section S1, said first section S1 being configured to carry signals from the device under test to the metalized wall of the guide hole, and then to the conductive tracks 23 and/or to other conductive elements of the guide 21; on the other hand, the second section S2 is configured to provide only a mechanical support.

Furthermore, the guide 21 can comprise both surface conductive tracks and conductive tracks embedded therein, as schematically illustrated in FIG. 5.

Generally, when several conductive tracks 23 extend both on the face Fa and/or Fb of the guide 21 and inside it, said conductive tracks 23 can be formed at different levels starting from the surface of the guide 21. The number of levels of the guide 21 in which the conductive tracks 23 are made can vary according to the needs and/or circumstances, in particular according to the number of the signals to be carried and thus according to the complexity of the routing pattern to be made in said guide 21. For example, in an embodiment, a first level may comprise conductive tracks adapted to carry a first type of signal and a second level may comprise conductive tracks adapted to carry a second type of signal.

As previously mentioned, the contact between the contact probe 10, in particular the first section S1 thereof, and the walls of the guide holes 22, preferably provided with the conductive portion 22w (i.e., preferably metalized, even more preferably entirely metalized), is a sliding contact which guarantees the electrical connection between said first section S1 and said conductive portion 22w (or possibly directly with the conductive track 23).

Suitably, still referring to FIG. 5, in an embodiment, the conductive tracks 23 (in particular the ends thereof opposite to the ends at the guide holes 22) are connected to respective contact pads 25, which are made on a face of the guide 21 (the face Fa in the example of the FIG. 5). In this way, it is possible to extract a respective signal from the probe head 20 and carry it for example to a PCB connected to said probe head 20 (for example by means of specifically designated wires or probes).

Furthermore, if the conductive tracks 23 are embedded in the guide 21, the contact ends of said conductive tracks 23 may emerge on a face thereof, so as to allow the electrical connection between said conductive tracks 23 and the respective contact pads 25.

Figure 6:
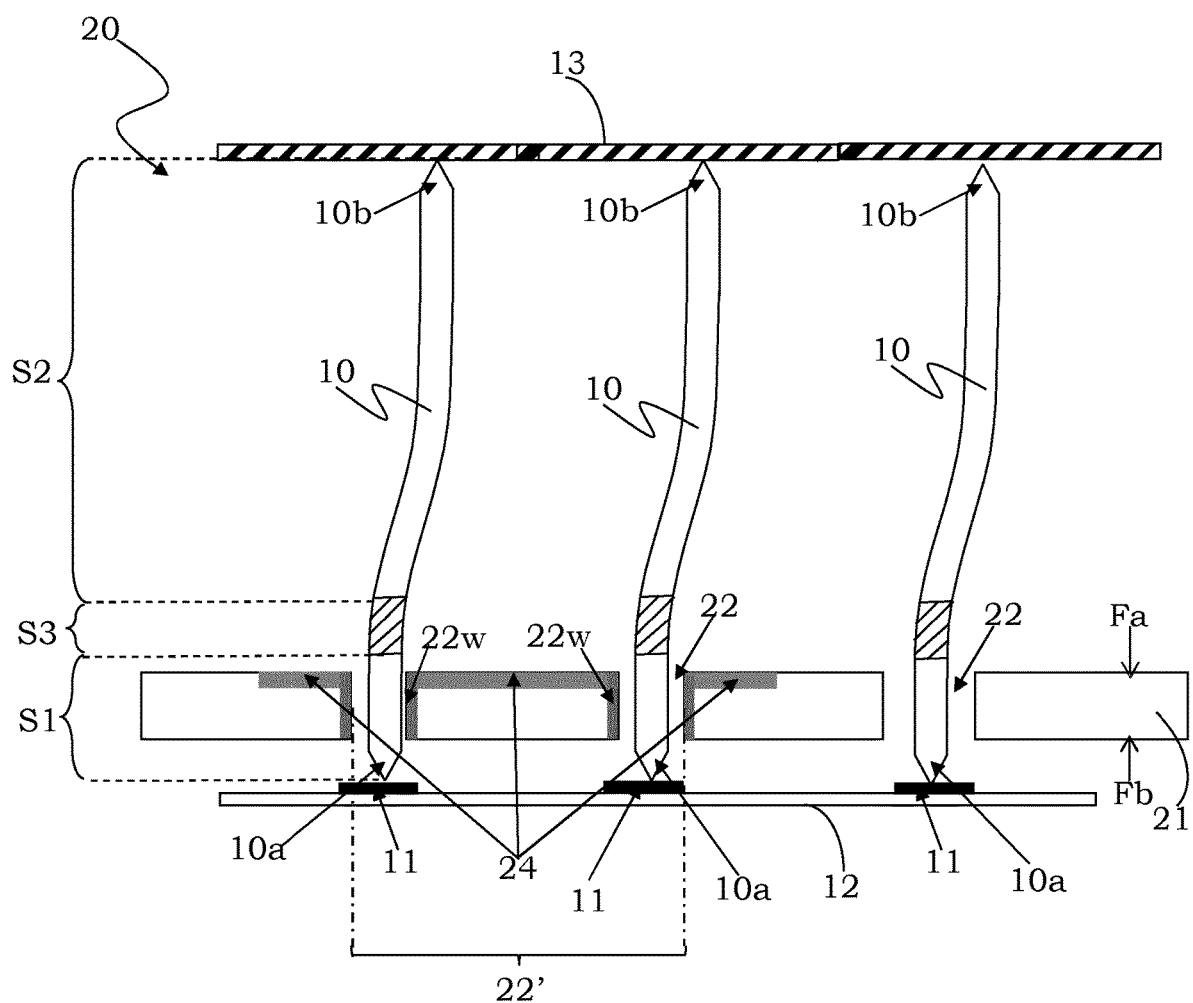
FIGS. 6 and 7 schematically show a probe head according to embodiments of the present invention, wherein a guide thereof comprises conductive portions which short-circuit contact elements.

Referring now to FIG. 6, according to an embodiment of the present invention, the probe head 20 comprises a conductive portion 24 acting as a conductive element which includes and electrically connects to each other the holes of a group 22' of the guide holes 22, said group 22' housing a corresponding group of contact probes 10, wherein said conductive portion 24 can be used in addition or alternatively to the conductive tracks 23.

In this way, at least two contact probes 10 can be electrically connected by the conductive portion 24 of the guide 21, said conductive portion 24 covering an area of the guide 21 which includes the group 22' of guide holes which house the contact probes which have to be short-circuited.

In other words, the conductive portion 24 encloses a group of holes (preferably metalized) which houses a corresponding group of probes, such that said probes are short-circuited by said conductive portion 24, which forms a common conductive plane.

If there is a need to short-circuit only two contact probes 10, it is preferred to use a conductive track 23 as electrical connection means between them, while, if there is a need to short-circuit a plurality of contact probes 10, it is preferred to use a conductive portion 24 as electrical connection means between them, said conductive portion 24 forming a common conductive (ground or power) plane for said contact probes 10. The presence of a common conductive plane is useful to reduce noises in the probe head, due for example to a difficult control of the impedance caused by the presence of several contact elements, said common conductive plane short-circuiting several contact elements. In this way, when the conductive portion 24 is used to electrically connect a plurality of signal probes or ground probes, the frequency performances of the probe head 20 are improved, with reduction of the noise in the carried signals.

The possibility to electrically connect different signal contact probes (by the conductive tracks 23 or also by the conductive portions 24), in particular the possibility to electrically connect the first section S1 of different signal contact probes, is particularly advantageous if there is the need to short-circuit two or more contact pads of the device under test, since it is possible to create loop-back configuration, in this way considerably shortening the path of the signals, which are not traversing all the contact probes from and towards the test apparatus but they stop at the conductive track or at the common conductive plane, with consequent advantages in terms of frequency performances of the probe head 20 as a whole.

Still referring to FIG. 6, the conductive portion 24 is arranged on a surface portion of the guide 21, in particular on the face Fa thereof (even if it could be arranged on the opposite face Fb thereof), or, in a non-illustrated embodiment, it can be arranged on both faces Fa and Fb, for example when a short-circuiting of different groups of probes is desired (ground and power, or different ground and power domains). As a non-limiting example of the present invention, FIG. 6 shows a probe head 20 comprising a surface conductive portion 24 which short-circuits to each other two contact probes housed in the group of holes 22'.

Alternatively, according to a non-illustrated embodiment, the conductive portion 24 can be embedded in the guide 21, forming a conductive plane inside said guide 21.

Obviously, the present invention is not limited to a particular configuration of the metallizations, which can vary according to the needs and/or circumstances.

Figure 7:
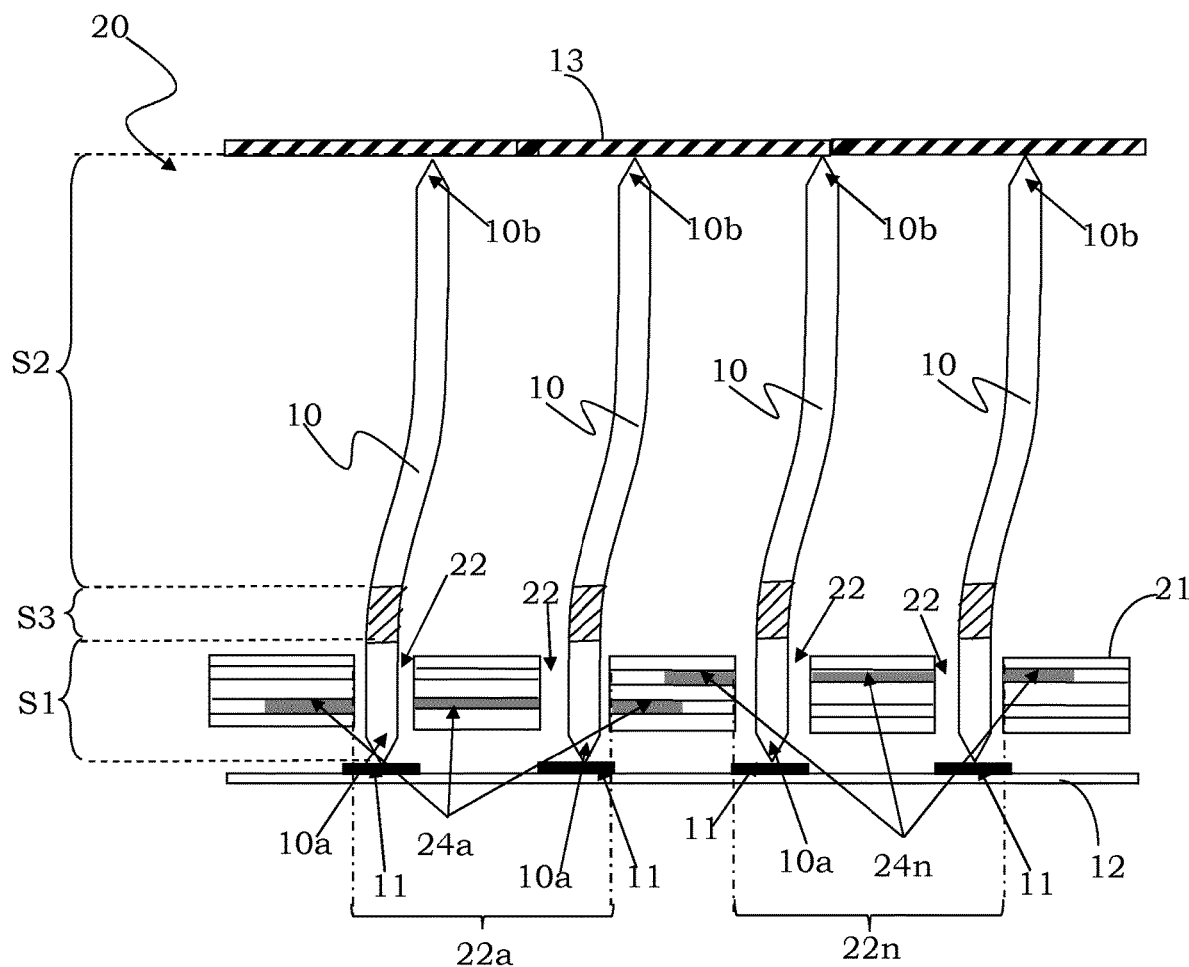

Furthermore, according to an embodiment illustrated in FIG. 7, the conductive portion 24 is in the form of a plurality of overlapping conductive layers 24a-24n, each of them including and electrically connecting to each other the holes of a respective group 22a-22n of the guide holes 22. In this way, each conductive layer 24a-24n is adapted to contact a corresponding group of the contact probes 10 according to the present invention, in particular the first section S1 thereof, wherein contact probes of each respective group are adapted to carry a same type of signal.

In this case, the guide 21 is a multilayer comprising a plurality of non-conductive layers, preferably a ceramic multilayer, the conductive layer 24a-24n being arranged on said non-conductive layers, which electrically insulate a conductive layer from the following.

In particular, each of the conductive layers 24a-24n is arranged on a face of a respective non-conductive layer of the guide 21 and has an area that is lower than an area of said face.

Alternatively, each of the conductive layers 24a-24n covers a face of a respective non-conductive layer with the exception of areas in which guide holes housing contact probes which are not yo be short-circuited are formed.

The conductive layers 24a-24n can also comprise surface layers made on at least one of the exposed faces Fa and Fb of the guide 21, or they can be only embedded in said guide 21, as illustrated in FIG. 7.

If the contact probes to be short-circuited are close (for example alternated) to contact probes that are not to be short-circuited, the conductive portion 24 (or alternatively each conductive layer 24a-24n) is locally interrupted by non-conductive areas so as not to electrically connect contact probes adapted to carry different signals. Accordingly, the non-conductive areas locally prevent the electrical connection between adjacent contact probes adapted to carry different signals.

For example, in the case of a plurality of conductive layers 24a-24n, the non-conductive areas of a specific conductive layer are made at the guide holes which house contact elements which are not to be short-circuited by said specific conductive layer, while said specific layer covers at least partially the walls of the guide holes which house contact elements which are to be short-circuited by it.

Furthermore, according to an embodiment which is not illustrated in the figures, the metallizations of two guide holes, or also two conductive portions 24, contacting the first section S1 of the contact probes 10, can be electrically connected to each other via a circuit component, such as for example a filtering capacitor, so as to optimize the loop-back technique, since said filtering capacitor is placed as close as possible to the contact tips of the probes.

Obviously, the circuit component can also be any other circuit component adapted to specific needs, such as for example an inductor or a resistor or also a relay.

As previously mentioned, the probe head 20 can also comprise more than one guide in addition to the lower guide 21, for example an intermediate guide and/or an upper guide (not illustrated in the figures), according to solutions known in the field.

Figure 8:
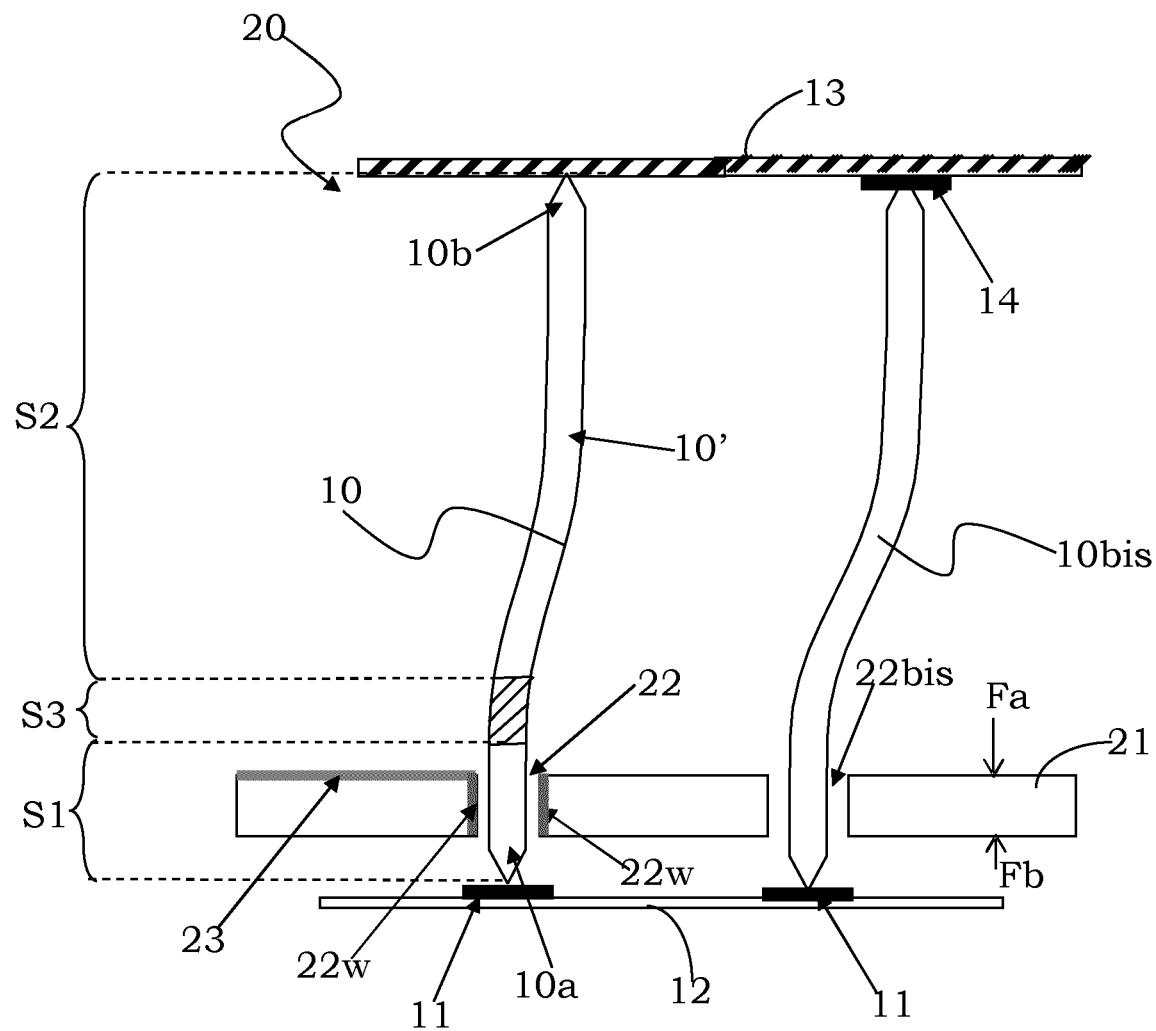
FIG. 8 schematically shows a probe head according to an embodiment of the present invention.

The probe head 20, in addition to the contact probes 10 according to the present invention, can also comprise contact probes 10*bis* made according to the prior art (i.e., entirely made of a same conductive material), said contact probes 10*bis* being housed in respective guide holes 22*bis*, as illustrated in FIG. 8. Accordingly, in this embodiment, the probe head 20 generally comprises a first group of contact probes according to the present invention and a second group of contact probes 10*bis* according to the prior art.

While the contact probes 10 are preferably adapted to carry high-frequency signals thanks to the reduced length of the first conductive section S1 thereof, the contact probes 10*bis* are generally adapted to carry ground or power signals or also low-frequency input/output signals, that is signals which can be carried by probes of the known type without incurring in problems of self-inductance, in any case simplifying the routing of the signals in the guide 21.

In this case, the contact probes 10*bis* are adapted to carry the signal from the device under test directly to the support plate 13, which comprises suitable conductive pads 14 against which the contact heads of said probes 10*bis* are adapted to abut.

In some embodiments, it is also possible to provide conductive portions which short-circuit said contact probes 10*bis* of the known type.

As previously mentioned, in an embodiment of the present invention, the contact probes 10 comprise, at the first section S1, protruding elements 15 which project from the body 10', which define conductive abutment surfaces CS configured to abut onto conductive elements of the guide, such as conductive tracks, possibly connected to conductive pads at the guide holes to guarantee a better contact with the conductive abutment surfaces CS of the probe, and/or onto conductive portions.

Figure 9:
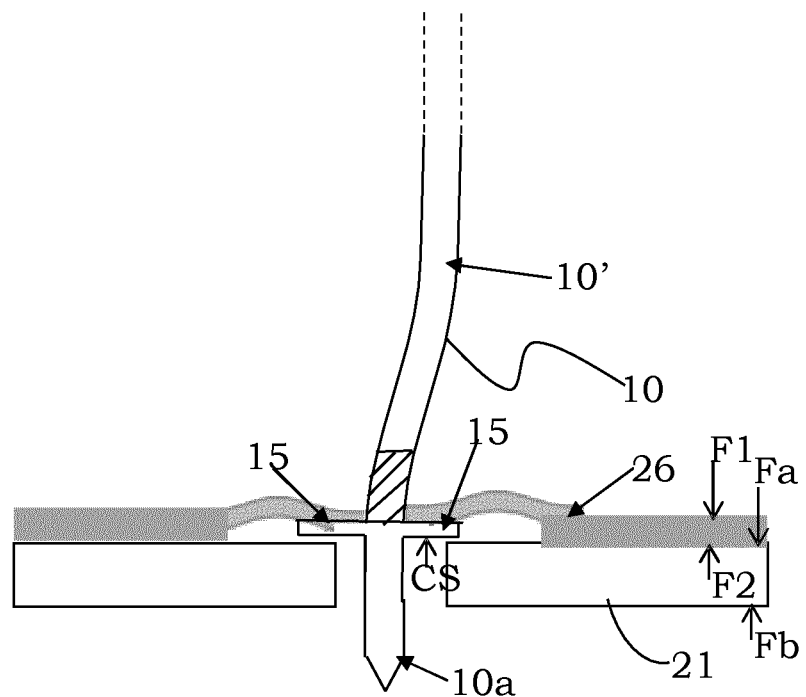
FIG. 9 schematically shows a portion of a probe head according to another embodiment of the present invention.

According to an embodiment of the present invention illustrated in FIG. 9, the probe head 20 further comprises a flexible membrane 26, which has a first face F1 and a second face F2, opposite the first face F1, said second face F2 being a lower face according to the local reference system of FIG. 9, that is a face facing the device under test, and said first face F1 being an upper face.

The flexible membrane 26 is arranged on a surface of the guide 21, in particular on the face Fa thereof, said flexible membrane 26 being shaped so as to comprise a plurality of passages (cuts) for the passage and connection of the contact elements 10, to which said flexible membrane 26 is connected for example at the protruding elements 15. The passages in the flexible membrane 26 are formed at least at the holes of the guide 21. The flexible membrane 26 comprises conductive tracks (not illustrated in the drawings) which extend from the passages, that is from the point contacting the contact probes, for redirecting (routing) the signals carried by the first section S1 of the contact probes. The conductive tracks can be made on a face of the flexible membrane and/or be embedded therein.

In an embodiment, the cuts in the flexible membrane 26 are such that it comprises a plurality of strips connected to the contact elements 10, in particular to the first conductive section S1 thereof. The strips can project and extend between a first end or proximal end, connected to the flexible membrane 26, and a second end or distal end, which is protruding and is not connected to any portion of the flexible membrane 26 and which is connected to the probe. In other words, the flexible membrane 26 can comprise at least one opening, preferably made in the central portion thereof, in which the strips extend and the distal end of said strips is free, a suitable empty space being defined between adjacent strips, which space separates them.

In the embodiment of FIG. 9, a portion of the flexible membrane 26, for example an end of a strip thereof, is laid abutting onto a conductive abutment surface CS of the first section S1, said flexible membrane 26 comprising suitable conductive tracks which extend from said abutment point to route the signals carried in said first section S1, said flexible membrane raising (lifting) during the contact with the device under test. Pre-raised portions can be provided to ease the raising (lifting) of the flexible membrane 26, reducing the stress to which the membrane is subjected. If there are strips, the ends of said strips, which can comprise the pre-raised portion to reduce the stress, move while the contact probes contact the device under test.

Also in this embodiment, the second section S2, which is separate from the first section S1 by the third section S3, acts only as damping support element of the probe head 20.

Figure 10:
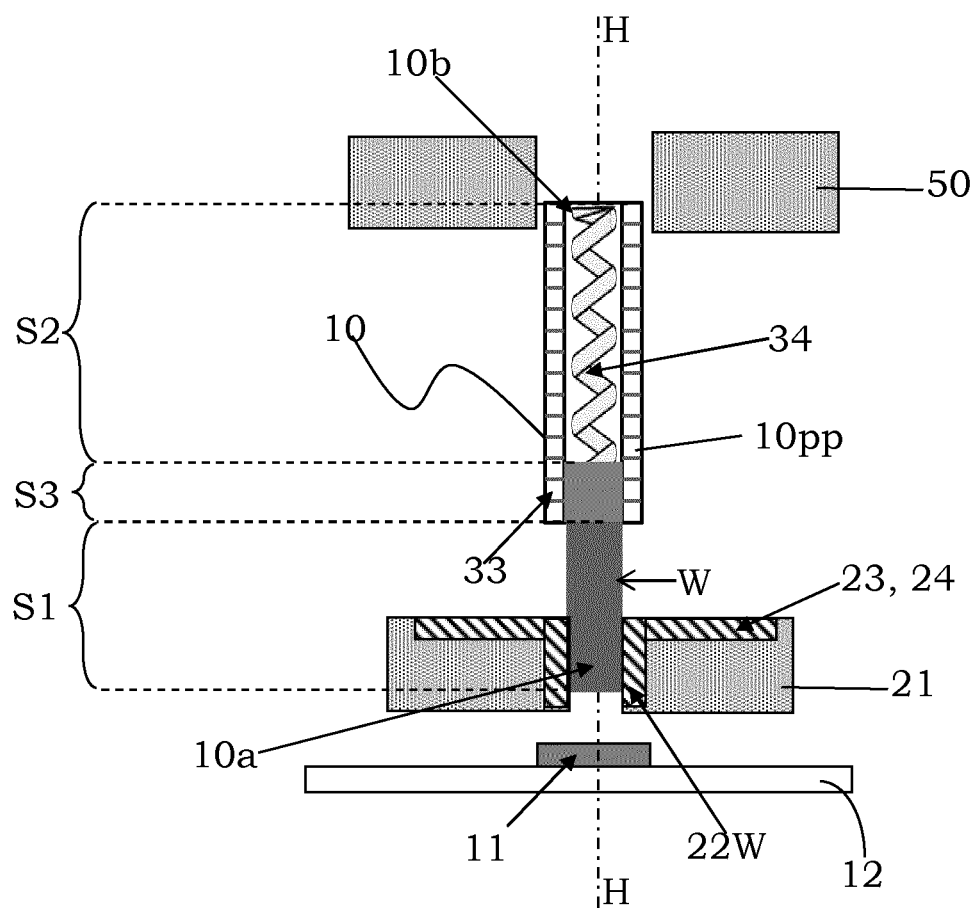
FIG. 10 schematically shows a probe head according to an embodiment of the present invention.

As previously observed, in FIGS. 1-9, the contact elements 10 are in the form of contact probes of the "buckling beam" type. In a further alternative and advantageous embodiment of the present invention, shown in FIG. 10, the contact elements of the probe head 20 are in the form of pogo pins, always represented with the reference 10. As mentioned above, all the advantageous technical characteristics discussed for the contact probes are transferred in a obvious way also to the pogo pins, which are also divided in three sections, wherein the first section S1 is short (lower than 1000 μm), conductive and adapted to contact conductive elements (conductive portions) of a guide of the probe head. In the same way, all the features described in relation to the probe head 20 also apply in this embodiment, with the due technical expedients which are well known to a skilled person.

In this embodiment, the probe head 20 comprises the lower guide 40 and generally also an upper guide 50 separated by an air gap. In any case, the present invention is not limited by the number of guides.

Suitably, in this embodiment, the second section S2 comprises an elastic element 34 (which is preferably conductive even if also other materials can be provided, also insulating materials) adapted to be compressed during the test, the insulating third section S3 being arranged between said elastic element 34 and the first section S1. The materials can be the same defined above. It is preferable a conductive material for the elastic element, even if, as seen above, other materials can be used, wherein the important thing is to guarantee the desired damping effect.

In other words, the body 10pp of the pogo pins 10 comprises the elastic element 34 (for example a spring) which forms at least one part of the second portion S2, which is electrically insulated from the first section S1 by the third insulating section S3. In an embodiment, the third section S3 is connected to an end of the elastic element 34, in particular the end of the elastic element 34 closer to the first section S1.

In particular, a first lower end of the elastic element 34 is connected to the third section S3, which can be analogous to the third section S3 illustrated with reference to FIGS. 2-9, said third section S3 being then connected to an upper end of the first section S1, which contacts the device under test and the conductive elements of the guide. In other words, the first section S1 is the tip element of the pogo pin and can have any suitable form. The second end of the elastic element 34 can be directly connected to an upper support, wherein the present invention is not limited by a particular configuration. The first section S1 is then inserted in the guide holes of the lower guide and is adapted to abut onto the pads 11 of the device under test by means of the contact tip while the second section S2 guarantees the desired damping effect, by means of the elastic element 34, and is not carrying the signal.

In a non-limiting embodiment of the present invention, the body 10pp of the pogo pins 10 includes a casing 33 which encloses at least one portion of the elastic element 34. The casing 33 of each pogo pin is preferably cylindrical in shape, but also other shapes are obviously possible, as well as, in some embodiments, said casing is not present and only the elastic element 34 is present.

Suitably, the lower guide and/or the upper guide comprise, as seen above, conductive elements for extracting the signal carried by the first section. In other words, the contact with the device under test is carried out by the first section S1, exactly as seen above in relation to the vertical probes, and conductive elements of the guide extract the signal. The damping effect is then guaranteed by the elastic element 34, which represents the second section S2 (or at least part of said second section) which is separated from the first section S1 by the third section S3 analogously to what has seen above.

This embodiment results in a lower mechanical stress between the interfaces S3/S2 and S3/S1 and it is therefore advantageous.

In conclusion, the present invention provides a contact element wherein a section thereof, which section comprises a contact tip for contacting a device under test, is electrically conductive and has a length lower than 1000 μm, preferably lower than 500 μm. This conductive section is adapted to contact conductive tracks or portions of a guide of a probe head in which the contact element is housed, and this conductive section is separate from the rest of the conductive body by an intermediate insulating section, the rest of the conductive body having a damping function and being adapted to abut, by means of a contact head thereof, onto a support plate associated with the probe head or in general onto other suitable supports. The contact element may advantageously be both a pogo pin (wherein the upper portion ensures the damping effect thanks to the presence of the spring) and a vertical contact probe (wherein this solution allows to maintain enough elasticity).

Advantageously, thanks to the contact element of the present invention, the probe head is particularly performing in high-frequency applications, thanks to the reduced dimensions of the conductive section of the contact elements, said conductive section being adapted to carry the operating signals and having a length lower than 1000 µm and thus much lower than the one of the contact elements of the prior art.

The signal is thus carried only by said short conductive section towards conductive tracks (or conductive portions) made at the lower guide of the probe head or made on a membrane arranged at said guide, the rest of the conductive body of the contact element being separate by the intermediate non-conductive section and acting only as a mechanical support. The rest of the conductive body thus guarantees an optimum contact with a support plate (which may be a PCB or any other support) and the desired bending (in case of vertical probes) or in general the desired damping effect of the contact, at the same time avoiding that said rest of the conductive body acts as antenna or stub, since the signal is not carried therein.

In other words, the conductive section adapted to carry the signals according to the present disclosure acts as a very short probe and thus eliminates the disadvantageous self-inductance problem which is present in the known solutions. At the same time, the contact element of the present disclosure perfectly works from a mechanical point of view thanks to the presence of the remaining second upper section, which is electrically insulated from the first conductive section and which is not carrying the signal, said remaining section being made of a material, for example preferably a suitable conductive material, suitable to guarantee the desired damping effect (for example the damping effect that occurs in the traditional long probes, and at the same time reducing the noise in the signal carried only in the first section), thus solving the technical problem of the present invention. The use of a conductive material for the second section guarantees an optimal damping effect.

The proposed solution thus allows to efficiently carry out the test of high-frequency devices without the problem of the rigidity of the short probes, dramatically reducing the possibility of breakage of the contact elements and simultaneously guaranteeing a suitable reduction of the pressure exerted by said contact elements, also preventing possible breakages of the contact pads of the devices under test onto which said contact elements abut. As said above, all this is eased by the fact that the second section (which is not intended to carry the signals) is made of a conductive material which guarantees an optimal damping effect (for example an optimal bending in the case of vertical probes).

The possibility of adopting a hybrid configuration, wherein further contact elements are adapted to carry specific signals, greatly simplifies the routing of the signals by the guide which, according to embodiments of the present invention, acts as a space transformer. This is useful especially in case of several signals to be carried through the probe head. For example, by means of said further contact elements it is possible to carry power signals and/or ground signals, that is signals which do not need particularly short contact elements, while the high-frequency signals, which should require short probes in order to avoid self-inductance problems, are carried in the short first conductive section of the contact elements according to the present invention.

Finally, the embodiment in which the contact elements are pogo pins is advantageous since the mechanical stresses between the various portions of the contact element are reduced. In fact, the pogo pins work vertically without shift between the guides, with consequent reduction of the stresses between the insulating interface S3 and the sections S1 and S2. In fact, it is important to ensure a good adhesion between said different interfaces, which, in the case of a probe head with vertical contact probes, are subjected to a shear stress due to the offset between the guides, in particular during the overtravel. Such problem is solved by a pogo pin, wherein the section S2 comprises an elastic element (for example a spring) which works vertically.

Obviously, a person skilled in the art, in order to meet contingent and specific requirements, may make to the contact element and to the probe head above described numerous modifications and variations, all included in the scope of protection of the invention as defined by the following claims.

The invention claimed is:

1. A contact element for a probe head for an electronic device test apparatus, the contact element comprising a body extending along a longitudinal axis between a first contact end, which is adapted to contact pads of a device under test, and a second and opposite contact end, wherein the body comprises:
    a first section which extends along the longitudinal axis starting from the first contact end towards the second contact end and is made of an electrically conductive material, the first section extending over a distance less than 1000 µm;
    a second section which extends along the longitudinal axis starting from the second contact end towards the first contact end and is made of an electrically conductive material; and
    a third section which is interposed between the first section and the second section and is made of electrically insulating material,
    wherein the first section, the second section, and the third section follow each other along the longitudinal axis so that the first contact end is included only in the first section and the second contact end is included only in the second section, and wherein the third section is configured to electrically insulate the first section from the second section,
    wherein the contact probe is configured so that, in use, a signal from a device under test is carried only by the first section, and
    wherein the second section has a length higher than the length of the first section.

2. The contact element according to claim 1, wherein the second section has a length ranging from 0.5 mm to 8 mm, and wherein the third section has a length ranging from 1 µm to 2 mm.

3. The contact element according to claim 1, wherein the electrically insulating material of the third section is selected from $Al_2O_3$, parylene, silicon.

4. The contact element according to claim 1, wherein the first section is configured to contact conductive elements of a guide of a probe head.

5. The contact element according to claim 4, comprising at least one wall configured to contact a corresponding metallized wall of a guide hole of the guide of the probe head at the first section, the first section being configured to carry signals from the device under test to the metallized wall of the guide hole and the second section being configured to provide only a mechanical support.

6. The contact element according to claim 1, wherein the first section comprises protruding elements which project from the body, the protruding elements defining conductive abutment surfaces.

7. The contact element according to claim 1, wherein it is in the form of a vertical contact probe of the buckling beam type.

8. The contact element according to claim 1, wherein it is in the form of a pogo pin, the second section comprising an elastic element adapted to be compressed during the test, and the third section being arranged between the elastic element and the first section.

9. A probe head for an electronic device test apparatus, the probe head comprising at least one guide provided with a plurality of guide holes for housing a respective plurality of contact elements, wherein said contact elements are made according to claim 1, the at least one guide comprising conductive elements which are configured to be electrically contacted by the first section of the contact elements.

10. The probe head according to claim 9, wherein the at least one guide is a lower guide arranged at the first section of the contact elements.

11. The probe head according to claim 9, wherein the conductive elements of the guide comprise conductive tracks which extend from the guide holes, the conductive tracks being formed on a face of the guide and/or being embedded in the guide.

12. The probe head according to claim 9, wherein the conductive elements of the guide comprise at least one conductive portion which includes at least one group of the guide holes and is configured to contact and short-circuit, at the first section, a corresponding group of contact elements which are housed in said group of holes and are adapted to carry a determined type of signal.

13. The probe head according to claim 12, wherein the conductive portion is formed on a face of the guide or is embedded in the guide.

14. The probe head according to claim 12, wherein the conductive portion is in the form of a plurality of conductive layers, each of the conductive layers including and electrically connecting to each other the holes of a respective group of the guide holes, and being configured to contact the first section of a corresponding group of the contact elements, wherein contact elements of each respective group are adapted to carry a same type of signal.

15. The probe head according to claim 9, wherein at least a portion of an inner surface of the guide holes is coated by a conductive portion connected with the conductive elements of the guide, the first section of the contact elements being adapted to electrically contact the conductive portion of the guide holes.

16. The probe head according to claim 9, comprising further contact elements which are entirely conductive and are adapted to carry a signal from a device under test directly to a support plate associated with the probe head, the further contact elements being adapted to carry power signals and/or ground signals and/or low frequency signals between the device under test and the support plate.

17. The probe head according to claim 9, wherein the contact elements comprise, at the first section, protruding elements which project from the body, the protruding elements defining conductive abutment surfaces configured to abut onto the conductive elements of the guide.

18. The probe head according to claim 17, further comprising a flexible membrane which is arranged on a surface of the guide and is a conductive element of the guide, the flexible membrane being shaped in such a way that a portion thereof is arranged on one or more of the conductive abutment surfaces of the first section and is adapted to be raised during the contact with the device under test, said flexible membrane comprising conductive tracks which extend to route the signals carried by the first section.

19. The probe head according to claim 9, wherein the conductive elements are in the form of vertical contact probes of the buckling beam type, the probe head comprising a lower guide and an upper guide whose guide holes are shifted from each other.

20. The probe head according to claim 9, wherein the conductive elements are in the form of pogo pins, the second section comprising an elastic element adapted to be compressed during the test, and the third section being arranged between the elastic element and the first section.

* * * * *